April 28, 1942.  J. F. CAMPBELL  2,281,411
FUEL CONTROL APPARATUS FOR INTERNAL COMBUSTION ENGINES
Filed March 2, 1938  4 Sheets-Sheet 2
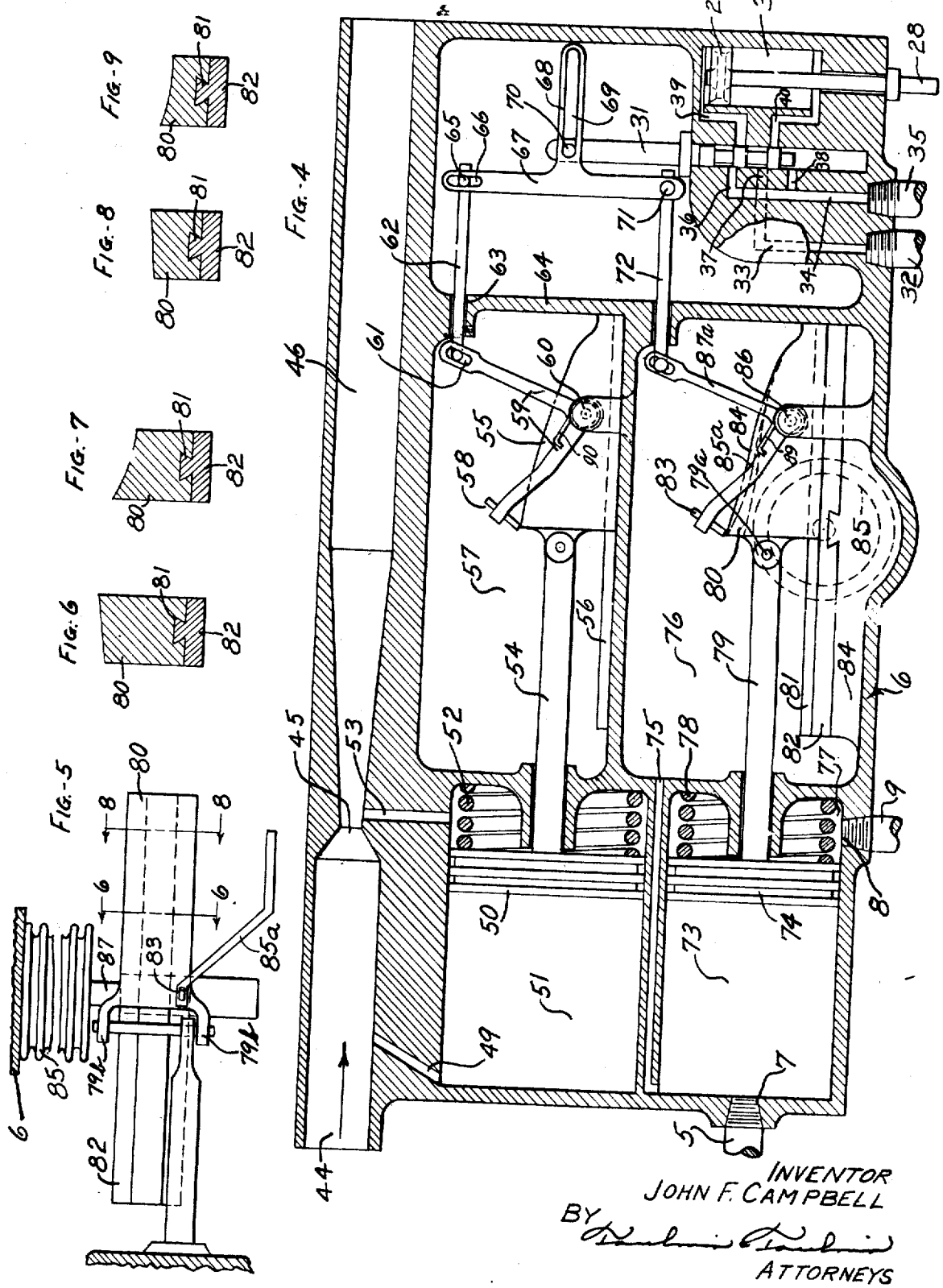
INVENTOR
JOHN F. CAMPBELL
BY
ATTORNEYS April 28, 1942.　　　　J. F. CAMPBELL　　　　2,281,411
FUEL CONTROL APPARATUS FOR INTERNAL COMBUSTION ENGINES
Filed March 2, 1938　　　4 Sheets-Sheet 3
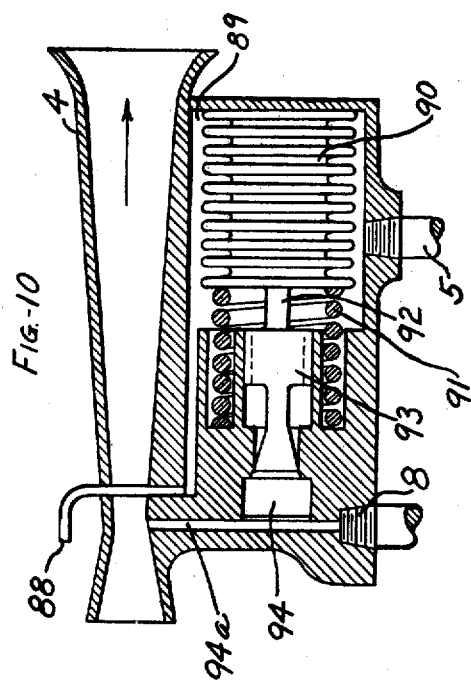
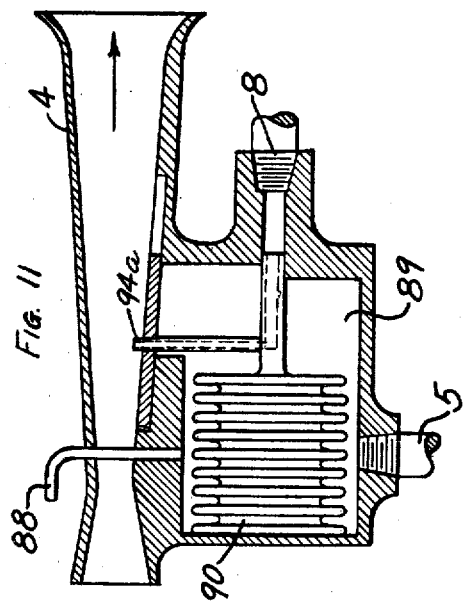
INVENTOR
JOHN F. CAMPBELL
BY
ATTORNEYS April 28, 1942.  J. F. CAMPBELL  2,281,411
FUEL CONTROL APPARATUS FOR INTERNAL COMBUSTION ENGINES
Filed March 2, 1938  4 Sheets-Sheet 4

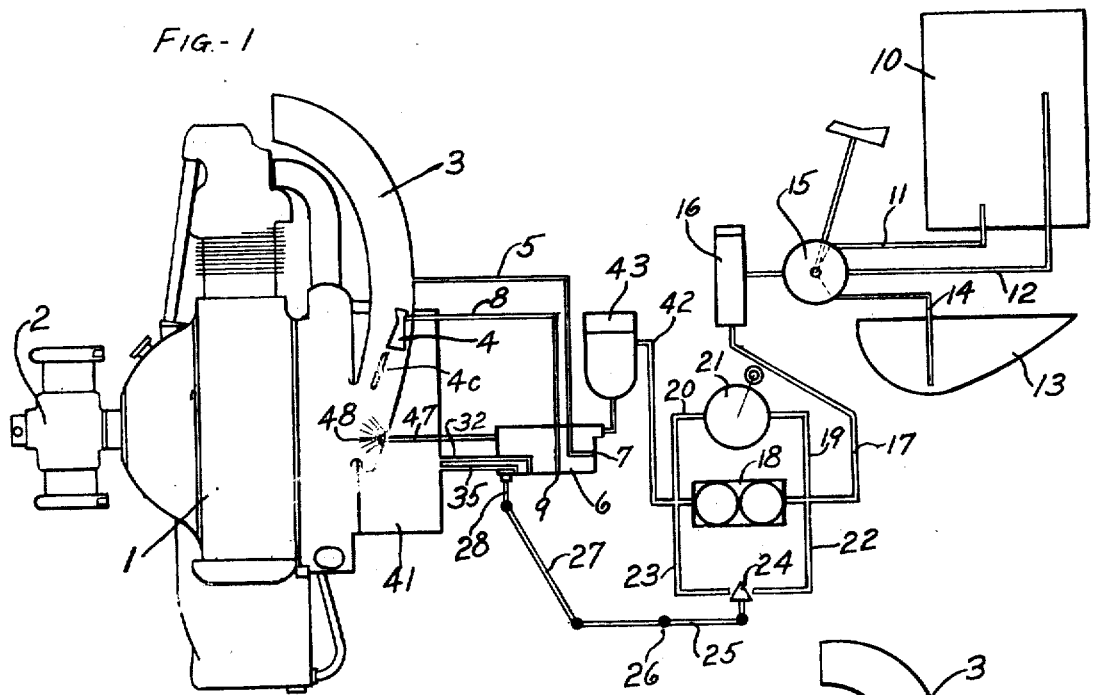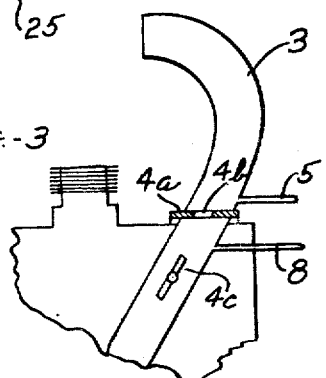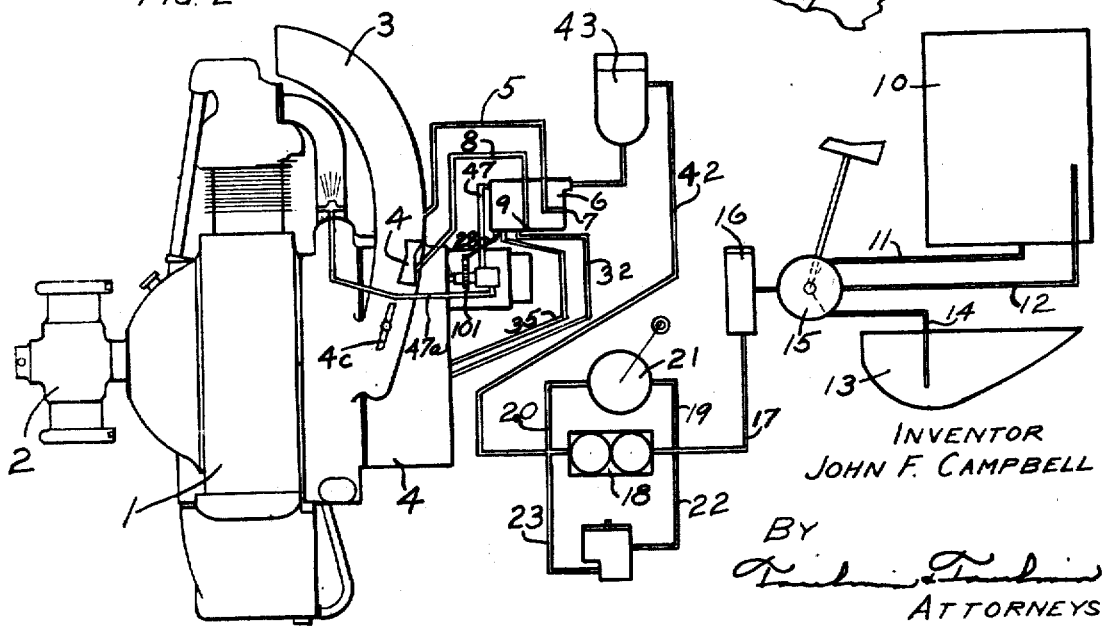

John F. Campbell
INVENTOR
BY
ATTORNEY

Patented Apr. 28, 1942

2,281,411

UNITED STATES PATENT OFFICE 2,281,411

FUEL CONTROL APPARATUS FOR INTERNAL COMBUSTION ENGINES

John F. Campbell, Dayton, Ohio, assignor to George M. Holley and Earl Holley

Application March 2, 1938, Serial No. 193,598

11 Claims. (Cl. 261—39)

It is the object of this invention to provide means and method of controlling the operation of an internal combustion engine, particularly an aircraft engine, by utilizing the mass of air which is flowing to regulate fuel flow.

It is a further object to use a venturi, orifice, nozzle or similar instrumentality to obtain an indication of the mass of air which is flowing by which fuel flow is regulated.

The mass of air flowing into an internal combustion engine is indicated, as it varies, by the differential in pressure caused by change in velocity between a main air body flowing into the engine and a by-pass body also flowing into the engine, which by-pass body is passed through some restricted orifice, such as a venturi, perforated plate, or the like.

It is an object of this invention to utilize this velocity principle in order to control fuel delivery to the engine.

It is an object of this invention to provide a fuel system, a proportioning means comprising a fuel indicator, an air and fuel adjusting means and a fuel control means. It is also an object to provide in combination therewith a differential pressure means controlled by the mass air flow and including a proportioner which controls the fluid supply and is operated in accordance with the pressure differential.

It is a further object to provide in combination therewith means for supplying, or injecting, the fuel.

It is an object to provide a Venturi compensating means to compensate for change in air density, that is, changes due to temperature variations and pressure variations.

Referring to the drawings, Figure 1 diagrammatically illustrates one form of the embodiment of my invention including a complete general system. In this system the amount of fuel furnished the engine is regulated by controlling the output from a fuel transfer pump and in which the fuel is introduced into a pipe of the induction system common to all cylinders thereof. This form of my invention operates upon the principle that the differential between the mass air flowing in the induction pipe and in a venturi is used to regulate the amount of fuel furnished by the fuel metering and distributing it.

Figure 2 shows a system similar to Figure 1 but employing a fuel nozzle for introducing the fuel separately into each cylinder.

Figure 3 diagrammatically illustrates a different form of restricted orifice for determining differentials in air pressure and which may be substituted for the Venturi tubes shown in Figures 1 and 2.

Figure 4 illustrates in detail the control mechanism employed in the systems shown in Figures 1 and 2, and which mechanism is controlled by the mass air flow from the Venturi air controlling means. By the functioning of the apparatus, an oil servo operated piston is caused to operate by reason of the changes in mass air flow to regulate the fuel delivered to correspond to that ratio of fuel and air previously established as desirable for the particular engine for that particular mass air flow and air density.

Figure 5 is a top plan view of the bellows compensator known as the air cam and density correction metal bellows.

Figure 6 is a section on the line 6—6 showing the contour of the cam when the venturi is compensated for density changes.

Figure 7 is a section on the same line showing the contour of the cam when the venturi is not compensated for density changes.

Figure 8 is a section on the line 8—8 of Figure 5 showing the contour of the cam when the venturi is compensated for density changes.

Figure 9 is a section on the line 8—8 of Figure 5 showing the contour of the cam when the venturi is not compensated for density changes.

Figure 10 illustrates a modified form of Venturi tube which may be substituted for that shown in Figures 1 and 2. In this modified Venturi tube, the pressure differences inside of and outside of the venturi indicate mass air consumption at various air densities.

Figure 11 illustrates still another form of Venturi tube which may be employed in Figures 1 and 2. In this particular venturi, the means for reducing the differential is shown to compensate for reductions in air density by moving the suction nozzle into a larger area where the suction is less.

Figure 12:
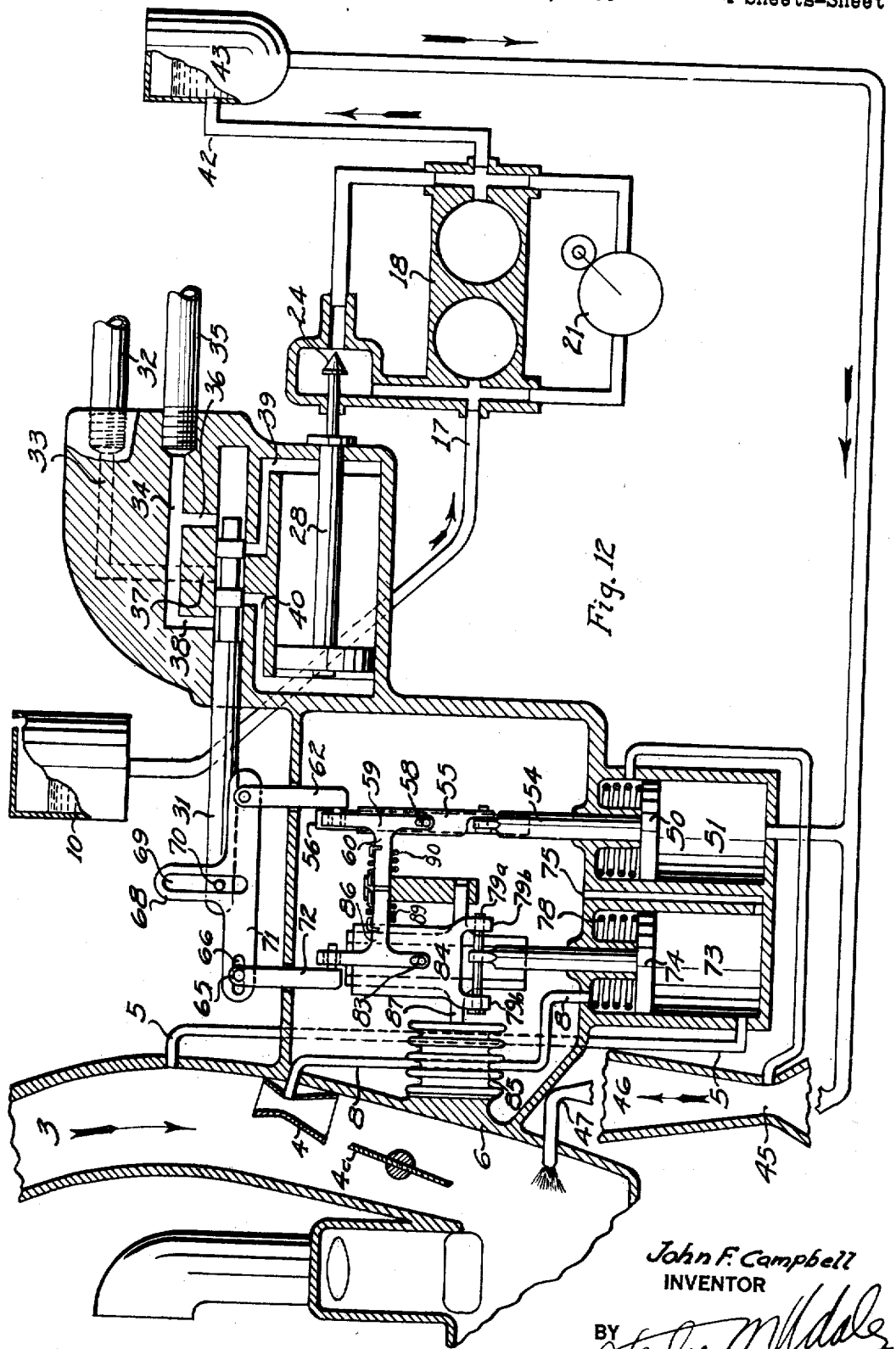
Figure 12 shows in one view the device illustrated diagrammatically in Figures 1, 4 and 5.

This invention is particularly adaptable to aircraft engines, although it is of general utility.

The principle upon which I base the operation of the method and apparatus of my invention is this: the volume of air passing through a channel in which a venturi is mounted is proportional to $\sqrt{P_1-P_2}$, where $P_1$=pressure in the channel and $P_2$=pressure at the throat of the venturi. Also as long as the air density in the channel remains constant the mass air flow is proportional to $\sqrt{P_1-P_2}$. However when the air density decreases and the specific volume of the air increases, for a given mass of air flowing through the channel, $\sqrt{P_1-P_2}$ increases in direct proportion to the density change.

Referring to the drawings in detail, 1 designates generally an internal combustion engine of the multiple cylinder radial type, which drives a hub 2 on which are mounted suitable blades of a propeller.

In Figure 1 there is a common air suction inlet pipe 3 in which is mounted a venturi 4 constituting an auxiliary passageway or by-pass. The suction pipe 3 has connected thereto a pressure differential pipe 5 in advance of the venturi which is connected to the differential control and proportioner mechanism generally designated 6. This pipe 5 is connected into 6 at 7. The pipe 8 leading from the venturi is connected into 6 at 9. Fuel is supplied either from the main fuel tank 10 through pipes 11 and 12 or from the supplementary or emergency tank 13 through the pipe 14.

This fuel supply is controlled through the valve 15 to the filter 16 and thence through the pipe 17 to the engine driven pump 18.

A by-pass comprising pipes 19 and 20 is provided through the hand pump 21. The by-pass through the pipes 22 and 23 is controlled by the valve 24 which is a pressure regulator valve. This pressure regulator valve is controlled by a valve lever 25 pivoted to 26, connected through a pitman 27 to the piston rod 28 attached to the piston 29 (Figure 4) operating the cylinder 30, which is the fuel control means hereinafter described.

When this piston rod 28 moves downwardly the fuel supply is increased, and when it moves upwardly, it is decreased, so operating in conjunction with the associated servo valve 31.

Oil under pressure enters through pipe 32 and passes through passageway 33, and thence through return oil passageway 34 and pipe 35. It also can pass through the distribution passageway 36, 37 and 38, as it is controlled by the valve 31 to control the entry of the oil to either end of the cylinder 30 through the passageways 39 and 40. The pressure lines 32 and 35 are connected into the oil reservoir system of the engine generally designated 41.

Returning to the engine driven pump 18, or hand pump 21, the fuel proceeds under pressure through the pipe 42, vapor eliminator 43 to the compensator 6 whence the fuel passes through the passageway 44 (Figure 4) as indicated by the direction of the arrow through the Venturi throat 45, pipe 46 and thence by pipe 47 (Figure 1) to an injector spray nozzle 48 over which the incoming air passes. This may be the nozzle of any form of carburetor or fuel supply device.

Such is the general operation of the system. The differential between the pressure condition in pipe 5 ($P_1$) and the pressure in pipe 8 ($P_2$) is utilized to compensate for the change in air density, due to changes in temperature and pressure.

As will be seen in Figure 3, instead of a venturi, a plate 4a with an opening 4b may be interposed in the suction line 3. This suction line is also controlled by the usual butterfly valve 4c.

The details of the venturi are shown in Figures 10 and 11. The system shown in Figure 2 is similar to that described in connection with Figure 1, except that a valve 101 is employed to control the fuel to the pipe 47a.

Turning to the operation of the compensator shown in Figure 4, which is shown in section and which is being viewed from an opposite side of the engine as shown in Figures 1 and 2, it will be understood that the fuel is flowing through the passageway 44. A part of this fuel is passed through the restricted passageway 49 in front of the piston 50 in the cylinder 51. This piston is normally pressed towards the left end by the spring 52. Fuel is delivered to the right end of the piston 50 through the passageway 53 which is on the outgoing side of the venturi 45 and the fuel line 44—46. The piston rod 54 which is connected to the piston 50 is pivotally connected to a cam 55 guided in the guide ways 56 in the chamber 57. There rides on this cam a cam follower 58 mounted on the bell crank having arms 59, said bell crank being pivoted at 60. A coil spring 90 is arranged to keep the cam follower 58 in engagement with the cam surface 55. The free end of the bell crank is slotted at 61 and is connected with a pitman 62 that is slidably supported in the passageway 63 in the partition 64. The other end of this pitman is connected by a pin 65 into a slot 66 in a compensating T-shaped member 67. The T portion of 67 is designated 68, and is provided with an elongated slot 69 in which operates the pin 70 on the upper end of the valve 31. The lower end of this T-shaped member is pivotally connected at 71 to a second pitman 72 connected with the differential air system to be hereinafter described.

Now turning to the differential air system, the pipe 5 ($P_1$) is connected to the cylinder 73 (Figure 4). This connection is on the left end of the air piston 74. A passageway 75 establishes communication between 73 and the chamber 76. On the right end of the piston 74 there is a chamber 77 connected to the Venturi pipe 9 ($P_2$). A spring 78 tends to move the piston 74 to the left end. The piston 74 is connected by its piston rod 79 to the cam block 80. This cam is cam shaped in two directions longitudinally and transversely as indicated by the dotted lines and the views 5 to 9 inclusive.

This cam block is mounted in a guide 81, which in turn is mounted upon a transverse slide 82 having a dove-tail engagement with the base 84. There is connected to this base a barometric metal bellows 85 anchored to the casing 6 at one end and connected by the connector 87 at its other end to the support 82. In this manner, the cam 80 is adapted to move laterally as well as longitudinally to accommodate this. The piston rod 79 is slidably mounted upon a cam cross rod 79a carried between the jaws 79b (Figure 5) mounted on the left hand end of the cam 80. A cam follower 83 rides upon the cam surface 84. This cam follower is mounted on the bell crank arm 85a pivoted at 86, the other arm of which, 87a, is loosely pivoted to the pitman 72 heretofore mentioned. A coil spring 89 is provided to keep the cam follower 83 in contact with the cam surface 84.

In Figures 6 to 9 will be seen sections through the cam 80 indicating the differences in contours of the cam, depending upon whether the venturi ($P_1-P_2$) is compensated for density changes.

The difference in pressure between the mass of air flowing in the intake manifold 3 and in the venturi 4 is transferred to the piston 74 through the opening 7 ($P_1$) and 8 ($P_2$). The movement of this piston 74 and the attached cam is proportional to $\sqrt{P_1-P_2}$. With knowledge of the engine mixture strength required, the cam 80 is so designed that the vertical height of its contour represents the fuel required for the corresponding air consumption. As illustrated each .050" lift represents ten per cent fuel consumption. In order to compensate for the fuel consumption required by the engine when operating at various altitudes, or air densities, cam 80 is moved horizontally by the gas filled metal bellows 85, which changes its length in proportion to density changes. The contour of cam 80 is varied in the transverse direction to compensate for the variation in fuel consumption needed for the engine due to variations in air density which vary with the altitude. The lift of the cam is transferred through the bell crank arms 85a—87 to the pitman 72 so that the position of this pitman represents the fuel consumption required for any mass air consumption at any air density.

Turning to the mechanism which furnishes an indication of the fuel consumption actually being used by the engine, the pressure differences between the pressure in pipe 44 and in pipe 49, as compared with the pressure in pipe 53 on the other side of venturi 45, is utilized to affect piston 50 which in turn moves cam 55. Each .050" lift of this cam represents ten per cent fuel consumption. This lift is transferred into horizontal motion of the pitman 62.

Any difference between the fuel consumption the engine is actually getting (position of pitman 62) and that which it should be receiving (position of pitman 72) for any particular air consumption or air density, causes the servo valve 31 to rise or fall depending upon which way the factor of out of balance occurs. A rise of the servo valve 31 will cause the piston 29 to lower, which will decrease the fuel consumption of the engine, as is indicated by the layout of the system in Figures 1 and 2. A lowering of the servo valve 31 will increase the fuel consumption.

The oil from the oil pressure system of the engine circulated to and from the servo valve 31 by the pipes 32 and 35 is merely a pressure medium used to move the piston 29 and piston rod 28, which in turn through the linkage 27 and 25 (Figure 1) controls the amount of fuel supplied by moving the valve 24.

Turning to the Venturi compensators shown in Figures 10 and 11, Figure 10 illustrates the venturi 4 with a Pitot tube 88, which communicates with a chamber 89 in which is mounted a metal bellows 90. The expansion of this bellows is resisted by the spring 91. The bellows is connected through the piston rod 92 which is guided by the guide 93 to a piston valve 94 which controls the size of the passageway 8. The chamber 89 is connected to the pipe 5. In this manner the contour valve 94 is positioned according to the air density through the metal bellows to supply a sufficient bleed through 5 ($P_1$) to 8 ($P_2$) to offset the increase in 5($P_1$) to 8 ($P_2$) which otherwise would occur.

In Figure 11, the tube 88 connecting with chamber 89 can bring about a movement of the metal bellows 90 which moves the pipe 94a foreand-aft together with the slidable plate 94b to which it is secured in order to compensate for reductions in air density. The suction nozzle 94a is therefore moved to a larger area in the venturi 4 where the suction is less.

*Method of operation*

It will thus be seen that there is provided a fuel source, a proportioner or compensator 6 comprising a fuel supply control means, a mass air differential adjusting means integrated with the fuel indicator to compensatingly adjust the fuel control means; and there is a mass air differential controlling means connected to said proportioner to regulate the amount of fuel according to the differential in pressure in the main air suction line and the by-pass line, that is, the Venturi line. There is associated with these means some form of fuel injector, or carburetor, the exact nature of which is not important in this invention. Additionally there is provided compensating means to compensate for changes in air density due to changes in temperature and pressure resulting from changes in altitude at which the engine is operated.

Accordingly the mass of air flowing is utilized to regulate the fuel flow by the differential in pressure caused by the change in velocity between the mass of air in the pipe 3 and the venturi or by-pass air body 4, which enables the regulation of the fuel flow in proportion to mass air flow to give satisfactory engine performance automatically without the intervention of the operator.

The bellows 85 is located on the walls of the inlet passage 6, and will therefore respond to the temperature of the entering air before it is cooled by the fuel entering through the nozzle 47. The bellows contains sufficient air so that as the temperature rises the air contained within the bellows 85 expands. In other word, the bellows 85 is a partially exhausted capsule. For this reason the bellows 85 will respond to temperature and pressure changes.

It will be understood that I desire to comprehend within my invention such modifications as may be necessary to adapt it to varying conditions and uses.

Having thus fully described my invention, what I claim as new and desire to secure by Letters Patent, is:

1. Fuel control means for an internal combustion engine comprising an air induction passage, means in said passage responsive to air flow therethrough to provide a differential fluid pressure proportional to air flow, a source of liquid fuel under pressure, and a conduit connecting the source with said induction passage, said fuel conduit including means responsive to fuel flow to provide a differential fluid pressure proportional to the rate of fuel flow, a device subject to and movable by the air differential pressure, a second device subject to and independently movable by the fuel differential pressure, a flow regulating valve controlling the effective capacity of the fuel conduit, a servomotor for operating said valve, means shiftable by the first device to positions determined by the measured rate of air flow, independently movable means shiftable by the second device to positions determined by the measured rate of fuel flow, and linkage means interconnecting the two last named means with the servomotor to move said valve to increase or decrease the capacity of said conduit depending upon whether the measured rate of fuel flow is respectively less or greater than that required to provide a predetermined variable fuel air ratio with the measured rate of air flow.

2. A device as set forth in claim 1 in which the linkage means includes a T-shaped link, and means controlling the servomotor and in which the device movable by the air differential pressure and the device movable by the fuel differential pressure consist of cams and cam followers, said followers engaging with the extremities of the head of the T-shaped link, the stem of which is connected with the means controlling the servomotor.

3. A device as set forth in claim 1 adapted for aviation use in which is incorporated means responsive to the static pressure of the air in the induction passage to modify the reaction of the air flow means with the fuel flow means to provide a variable fuel air ratio depending both on the rate of air flow by weight and on the air density.

4. A device as set forth in claim 1 in which is incorporated means responsive to the temperature of the air in the induction passage to modify the reaction of the air flow means with the fuel flow means to provide a variable fuel air ratio depending both on the rate of air flow by weight and on the air density.

5. A device as set forth in claim 1 adapted for aviation use in which means responsive to the temperature and static pressure of the air in the induction passage modifies the relative positioning of the means responsive to air flow and the means responsive to fuel flow so as to provide a variable fuel air ratio depending both on the rate of air flow by weight and on the air density.

6. A device as set forth in claim 1 in which means responsive to the temperature of the air in the induction passage modifies the relative positioning of the means responsive to air flow and the means responsive to fuel flow so as to provide a variable fuel air ratio depending both on the rate of air flow by weight and on the air density.

7. A device as set forth in claim 1 adapted for aviation use in which means responsive to the static pressure of the air in the induction passage modifies the relative positioning of the means responsive to air flow and the means responsive to fuel flow so as to provide a variable fuel air ratio depending both on the rate of air flow by weight and on the air density.

8. A device as set forth in claim 1 adapted for aviation use in which is incorporated means responsive to the temperature and static pressure of the air in the induction passage to modify the reaction of the air flow means with the fuel flow means to provide a variable fuel air ratio depending both on the rate of air flow by weight and on the air density.

9. A device as set forth in claim 1 adapted for aviation use in which the device movable by the air differential pressure consists of a cam having a double curvature and a cam follower engaging therewith and in which there are means responsive to the temperature and static pressure of the air in the induction passage for moving said cam at right angles to its motion in response to changes in the air differential pressure and in which the device movable by the fuel differential pressure also consists of a cam and cam follower.

10. A device as set forth in claim 1 adapted for aviation use in which the device movable by the air differential pressure consists of a cam having a double curvature and a cam follower engaging therewith and in which there are means responsive to the static pressure of the air in the induction passage for moving said cam at right angles to its motion in response to changes in air differential pressure and in which the device movable by the fuel differential pressure also consists of a cam and cam follower.

11. A device as set forth in claim 1 in which the device movable by the air differential pressure consists of a cam having a double curvature and a cam follower and in which there are means responsive to the temperature of the air in the induction passage for moving said cam at right angles to its motion in response to changes in air differential pressure and in which the device movable by the fuel differential pressure also consists of a cam and cam follower.

JOHN F. CAMPBELL.